(12) United States Patent
Lee

(10) Patent No.: US 7,576,792 B2
(45) Date of Patent: Aug. 18, 2009

(54) LENS MODULE FOR DIGITAL CAMERA

(75) Inventor: Chun-Yu Lee, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 374 days.

(21) Appl. No.: 11/416,370

(22) Filed: May 1, 2006

(65) Prior Publication Data
US 2007/0058072 A1    Mar. 15, 2007

(30) Foreign Application Priority Data
Sep. 9, 2005    (CN) ......................... 2005 1 0037234

(51) Int. Cl.
H04N 5/225   (2006.01)
G03B 7/24    (2006.01)
G02B 13/14   (2006.01)

(52) U.S. Cl. .................. 348/335; 396/209; 359/356

(58) Field of Classification Search ............. 348/342, 348/335; 396/209, 307; 359/350, 356
See application file for complete search history.

(56) References Cited

U.S. PATENT DOCUMENTS

| 6,236,521 | B1 * | 5/2001 | Nanba .................. 359/715 |
| 6,759,642 | B2 * | 7/2004 | Hoshino ................. 250/208.1 |
| 6,825,983 | B2 * | 11/2004 | Bourdelais et al. ......... 359/586 |
| 7,375,757 | B1 * | 5/2008 | Hoshino et al. ........... 348/340 |
| 2004/0251510 | A1 * | 12/2004 | You et al. ............... 257/433 |
| 2005/0195503 | A1 * | 9/2005 | Chen .................... 359/819 |
| 2006/0066766 | A1 * | 3/2006 | Tanaka et al. ............ 349/44 |

FOREIGN PATENT DOCUMENTS

| CN | 2652049 Y | 10/2004 |
| CN | 2665731 Y | 12/2004 |
| CN | 1814450 A | 5/2005 |

* cited by examiner

Primary Examiner—Nhan T Tran
Assistant Examiner—Mekonnen Dagnew
(74) Attorney, Agent, or Firm—Steven M. Reiss

(57) ABSTRACT

A digital camera module (100) includes a barrel (1), an IR-cut filter (3) and at least one lens element (4). The IR-cut filter is fixed to the barrel. The at least one lens element is received in the barrel and is disposed behind the IR-cut filter so that incoming light firstly passes through the IR-cut filter, then passes through the at least lens element. The IR-cut filter may protect the at least one lens element so as to improve the quality of the digital camera.

10 Claims, 2 Drawing Sheets

LENS MODULE FOR DIGITAL CAMERA

BACKGROUND OF THE INVENTION

1. Field of the Invention

The present invention relates generally to digital camera, and more particularly, to a lens module for a digital camera.

2. Discussion of the Related Art

Generally, digital cameras are image recording media capable of photographing a plurality of still images without using film. Such a digital camera typically uses an image pickup device, which is a kind of semiconductor device, such as a charge coupled device (CCD) or complementary metal oxide semiconductor (CMOS). In the digital camera, an object image formed on the image pickup device through a lens is converted into an electrical signal by the image pickup device, and the electrical signal is stored as a digital signal.

However, the color spectrum seen by a CCD or CMOS camera is much wider than the spectrum seen by the human eye. Especially in the near infrared region of the spectrum the difference in sensitivity is significant. Since many light sources, including the sun, emit infrared light, a CCD or CMOS camera in daylight will therefore see a significant amount of infrared light resulting in strange colors. Therefore, many lenses need to be designed with an IR-cut filter. The IR-cut filter may block the transmission of the infrared light while passing the visible light.

A typical lens for a digital camera is represented in FIG. 2. The lens includes an aperture stop 81, a first lens element 82, a field stop 83, a second lens element 84, an IR-cut filter 85 and a CMOS image sensor 86. The first lens element 82 and the second lens element 84 are made of plastic, and are aspheric lens elements. The light reflected from an image object passes through the first lens element 82 and the second lens element 84. The light is then focused and then passes through the IR-cut filter 85. The light then arrives at the CMOS image sensor 86. The aperture stop 81 can adjust the quantity of the light entering from the outside. The field stop 83 can control the quantity of the light entering the CMOS image sensor 86. The IR-cut filter 85 filters the infrared rays from the light. Although the lens is light and does not easily break owing to using plastic lens elements, the first lens element 82 is located at the front, and is easily scraped or abraded which can effect the image quality.

Therefore, a digital camera with a new lens module is desired in order to overcome the above-described shortcomings.

SUMMARY OF THE INVENTION

In one embodiment thereof, a digital camera lens module includes a barrel, an IR-cut filter and at least one lens element. The IR-cut filter is fixed to the barrel. The at least one lens element is received in the barrel and is disposed behind the IR-cut filter so that incoming light firstly passes through the IR-cut filter, then passes through the at least lens element.

Other advantages and novel features will become more apparent from the following detailed description when taken in conjunction with the accompanying drawings.

BRIEF DESCRIPTION OF THE DRAWINGS

Many aspects of the lens for digital camera can be better understood with reference to the following drawings. The components in the drawings are not necessarily drawn to scale, the emphasis instead being placed upon clearly illustrating the principles of the digital camera module. Moreover, in the drawings, like reference numerals designate corresponding parts throughout the several views.

DETAILED DESCRIPTION OF THE EMBODIMENTS

Figure 1:
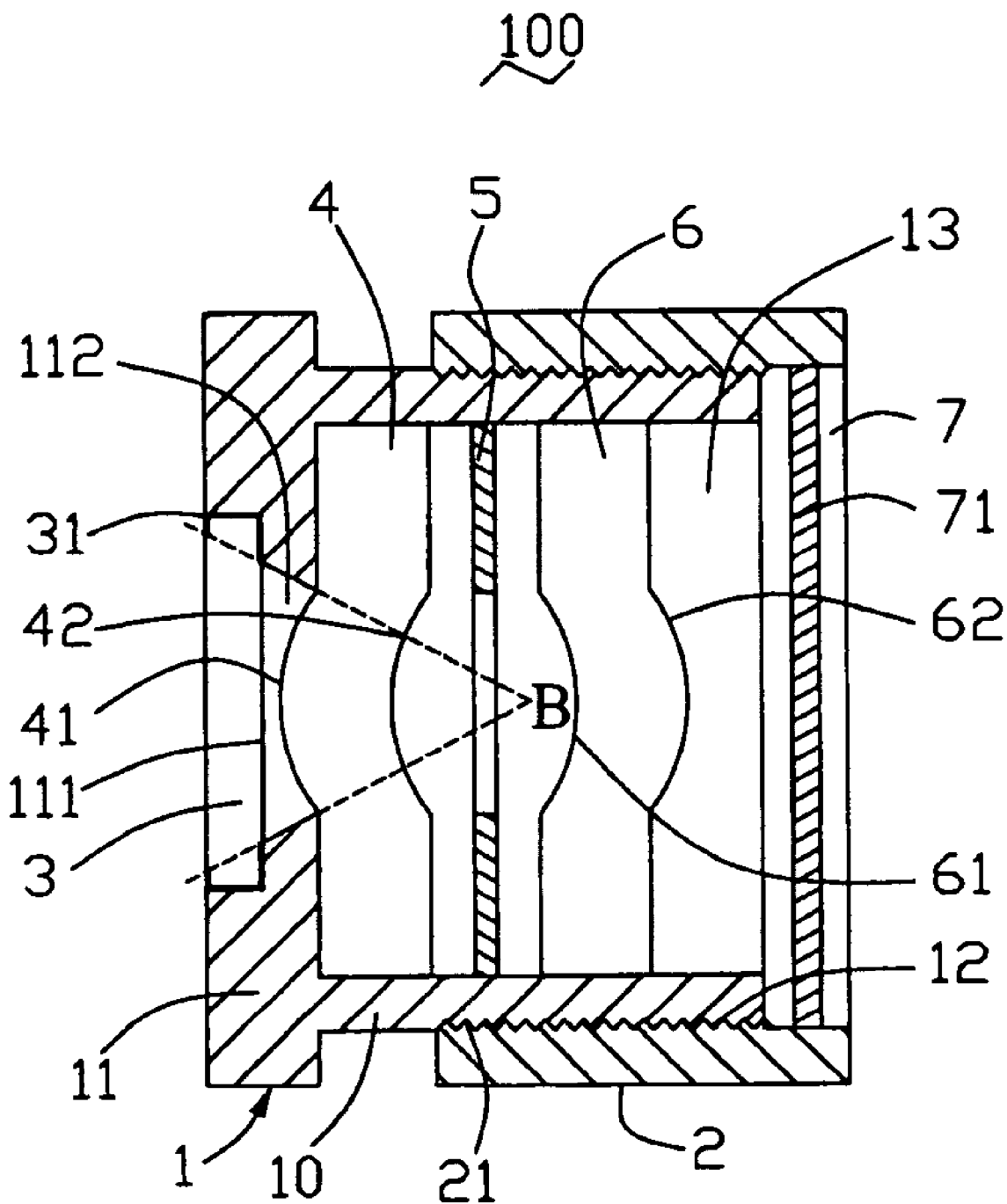
FIG. 1 is an cut-away view of an embodiment of a lens for a digital camera.
Figure 2:
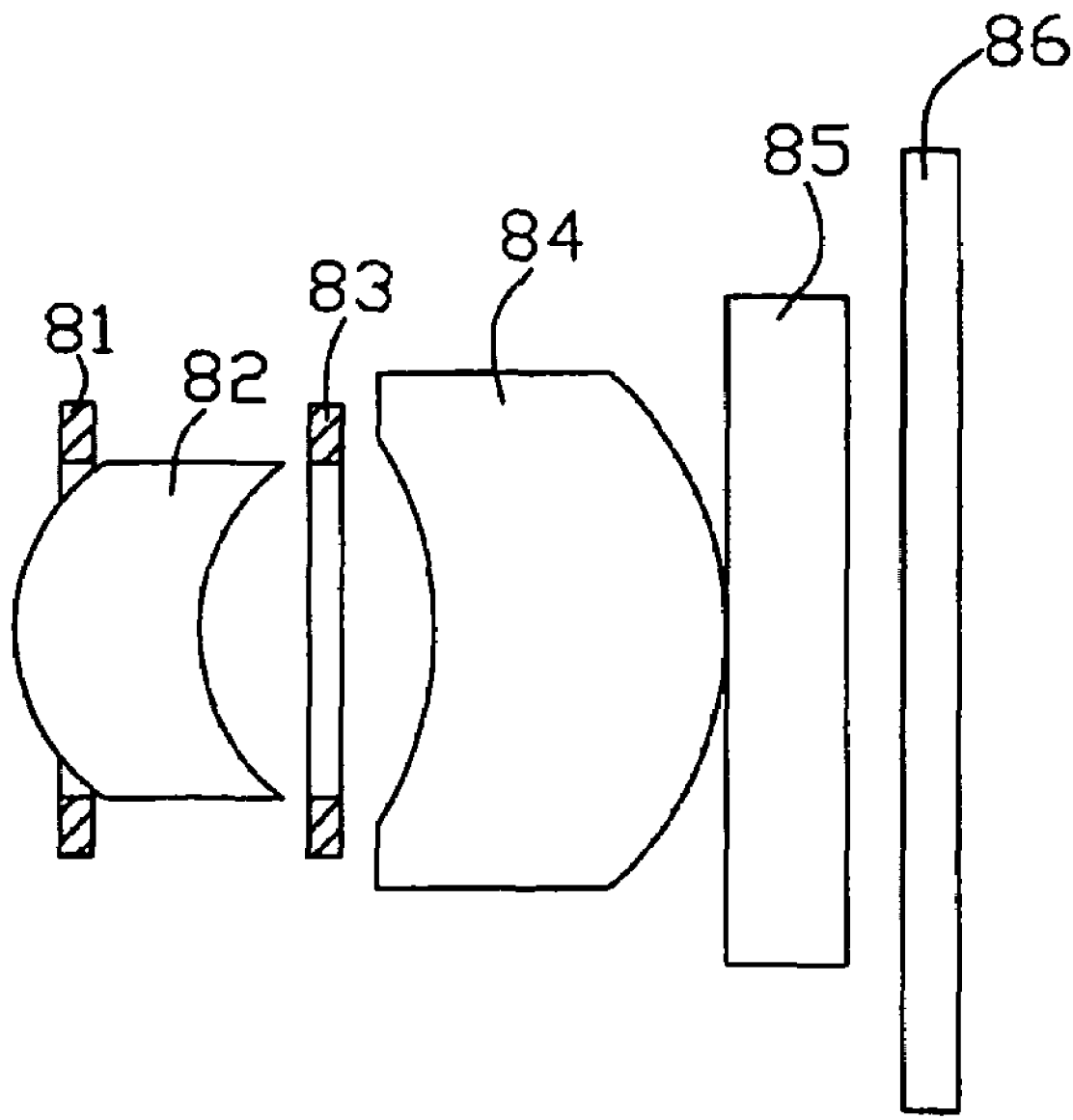
FIG. 2 is a conventional schematic view of a lens for a digital camera.

Referring now to the drawing, FIG. 1 shows a digital camera module 100, according to a preferred embodiment. The digital camera module 100 is adapted for use in a digital camera or a portable electronic device such as a mobile phone or a personal digital assistant (PDA), but the compact nature thereof could prove useful in compact digital camera units and digital camcorders as well. The digital camera module 100 includes a barrel 1, a base 2, an IR-cut filter 3, a first lens element 4, a field stop 5, a second lens element 6 and an image sensor 7.

The barrel 1 is substantially a cylinder in shape, and has a barrel body 10 and a flange 11 formed together. The barrel body 10 has a through hole 13 defined therein. The flange 11 is formed at one end of the barrel body 10. The flange 11 has a rectangular hole 111 defined in one side thereof, and a frustum hole 112 defined in an opposite side thereof. The frustum hole 112 communicates with the rectangular hole 111 and the through hole 13 so that light beams can be transmitted therethrough. The barrel body 10 has an outer thread 12 defined in the outside periphery wall thereof.

The base 2 is substantially a hollow cylinder in shape. An outer diameter of the barrel body 10 is approximately equal to an inner diameter of the base 2 so that the barrel 1 may be inserted into the base 2. The base 2 has an inner thread 21 defined in the inside periphery wall thereof for engaging with the outer thread 12 of the barrel 1.

The IR-cut filter 3 is situated in the rectangular hole 111 of the barrel 1. At least one surface of the IR-cut filter 3 is coated with an IR-cut coating. The IR-cut coating can filer out infrared rays from incoming light so as to improve the image quality. The outside portions of IR-cut filter where the two extending lines "B" of the frustum hole intersect with the rectangular hole are blackened. The blackened portions of the IR-cut filter may absorb those light radiating thereat, thus avoiding the reflection of the IR-cut filter 3 effecting the image quality.

The first lens element 4 includes two aspheric surfaces 41 and 42, with both convex to the flange 11. The first lens element 4 is made of plastics. The second lens element 6 also includes two aspheric surfaces 61 and 62, with both convex to the direction opposite to the flange 11. The second lens element 6 is made of plastics. Both of the lens elements are received in the barrel body 10 of the barrel 1.

The field stop 5 is ringlike in shape, and is received in the barrel body 10 of the barrel 1. The field stop 5 is located between the first lens element 4 and the second lens element 6. The field stop 5 may control/limit the quantity of the light arriving at the image sensor 7, thereby preventing ghost images or lens-flare.

The image sensor 7 is usually a charge-coupled device (CCD) or a complementary metal-oxide semiconductor (CMOS). The image sensor 7 has an image sensor surface 71, and the image sensor 7 is located behind the second lens element 6, and is received in the base 2. The image sensor 7 may transform light signals to electronic signals.

In assembly, firstly, the blackened IR-cut filter 3 is fixed in the rectangular hole 111 of the barrel 1 by means of adhesion and/or welding. The first lens element 4, the field stop 5 and the second lens element 6 are received in the barrel body 10 of the barrel 1 in that order, with the first aspheric surface 41 of the first lens element 4 being accommodated in the frustum hole 112. After that, the image sensor 7 is fixed in the base 2 by means of adhesion and/or welding. Finally, the assembled barrel 1 is threaded into the base 2. Accordingly, all of the above elements are assembled together.

In use, the digital camera module 100 can be fitted within a portable electronic device, such as a mobile phone, and the image sensor 7 is electrically connected with a circuit board of the mobile phone for receiving power. When taking pictures, the light reflected from an image object (not shown) firstly passes through the IR-cut filter 3. The IR-cut filter 3 filters the infrared rays from the incoming light so as to improve the image quality. Then, the light is transferred to the first lens element 4, then the field stop 5 and then the second lens element 6 in that order. The first lens element 4 and the second lens element 6 focus the light, after which, the light arrive at the image sensor 7. The image sensor 7 then transforms the light signal to an electronic signal, permitting the storage of the image information in the digital camera memory.

A main advantage of the digital camera module with a front IR-cut filter is that the IR-cut filter not only filters infrared rays from incoming light, but also protects the first lens element.

In a still further alternative embodiment, the base 2 may be rectangular. The base 2 and the barrel 1 may be molded together as a whole during manufacture. In the above embodiment, the IR-cut filter, the first lens element, the field stop, the second lens element and the image sensor are disposed on the same optical path.

As described above, the base may has a bottom for sealing the barrel. Accordingly, a closed space is cooperatively formed between the barrel, the filter and the base.

As described above, the preferred embodiment provides a digital camera module with a front IR-cut filter for devices such as mobile phones, having both simplicity and ease of use. It is, however, to be understood that the digital camera module could potentially be useful in other applications in which it may be desirable to allow incoming light to be adjusted so as to attain a clear image.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A digital camera lens module comprising:
    a barrel defining a rectangular hole and a frustum hole communicating with the rectangular hole, two sides of the frustum hole having two extending lines,
    an IR-cut filter being received in the rectangular hole, and the outside portions of IR-cut filter where the extending lines of the frustum hole intersect with the IR-cut filter being blackened;
    at least one lens element received in the barrel, and the at least one lens element being disposed behind the IR-cut filter so that incoming light firstly passes through the IR-filter, then passes through the at least lens element.

2. The digital camera lens as claimed in claim 1, wherein the barrel includes a flange and a barrel body formed together, the flange defines the rectangular hole defined in one side thereof, and the frustum hole defined in an opposite side thereof, the barrel body has a through hole defined therein, and the through hole communicates with the rectangular hole and the frustum hole.

3. The digital camera lens as claimed in claim 1, wherein the at least one lens element includes a first lens element and a second lens element, the first lens element being immediately behind the IR-cut filter along an optical path, and the first lens element is a plastic lens.

4. The digital camera lens as claimed in claim 3, wherein the second lens is a plastic lens.

5. The digital camera lens as claimed in claim 3, wherein a field stop is disposed between the first lens element and the second lens element.

6. A digital camera module having an optical path, the digital camera module comprising:
    a barrel having an optical opening allowing light to transmit therethrough and a frustum hole communicating with the optical opening, two sides of the frustum hole having two extending lines;
    an IR-cut filter attached to the barrel at the optical opening, the IR-cut filter being within the optical path, the outside portions of IR-cut filter where the extending lines of the frustum hole intersect with the IR-cut filter being blackened;
    at least one lens element received in the barrel and being within the optical path, the at least one lens element disposed behind the IR-cut filter with respect to the optical path;
    a base engaging with the barrel; and
    an image sensor fixed in the base, relative to the optical path.

7. The digital camera module as claimed in claim 6, wherein the barrel includes a flange and a barrel body formed together, the IR-cut filter is fixed in the flange.

8. The digital camera module as claimed in claim 7, the barrel body has a through hole defined therein, and the through hole communicates with the optical opening and the frustum hole.

9. The digital camera module as claimed in claim 6, wherein the at least one lens element includes a first lens element and a second lens element, and the first lens element and the second element are aspheric plastic lenses.

10. The digital camera module as claimed in claim 6, wherein the barrel defines an outer thread at the outer periphery wall, the base is a hollow cylinder, the inner periphery wall is defined an inner thread, and the outer thread of the barrel engages in the inner thread of the base.

* * * * *